April 2, 1957 A. VANDENBERG ET AL 2,787,404
COW FEEDER
Filed Feb. 26, 1954

INVENTORS.
AUGUST VANDENBERG,
BEN W. VANDENBERG.
BY

ATTORNEY.

United States Patent Office 2,787,404
Patented Apr. 2, 1957

2,787,404

COW FEEDER

August Vandenberg and Ben W. Vandenberg,
Bellflower, Calif.

Application February 26, 1954, Serial No. 412,739

3 Claims. (Cl. 222—428)

This invention relates to a cow feeder, particularly for milk cows, and one object of our invention is to provide a cow feeder which can be so positioned that cows in adjacent stalls or stanchions can be simultaneously fed.

Another object of our invention is to provide a novel cow feeder in which the quantity of feed delivered to a cow can be varied to suit the requirements of the particular animal.

Still another object of our invention is to provide a novel cow feeder in which the gates at the bottom of the feeder are controlled from a single handle on top of the feeder.

A feature of our invention resides in the means to close the gates automatically as soon as pressure is taken off of the control handle.

Other objects, advantages and features of invention may appear from the accompanying drawing, the subjoined detailed description and the appended claims.

Figure 1:
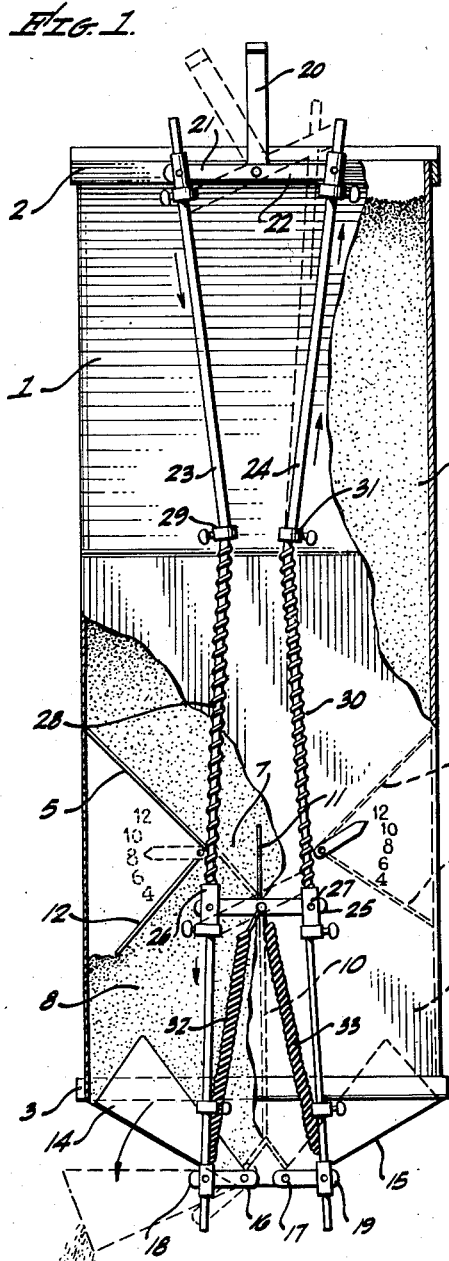
Figure 1 is a rear elevation of our cow feeder.
Figure 1:
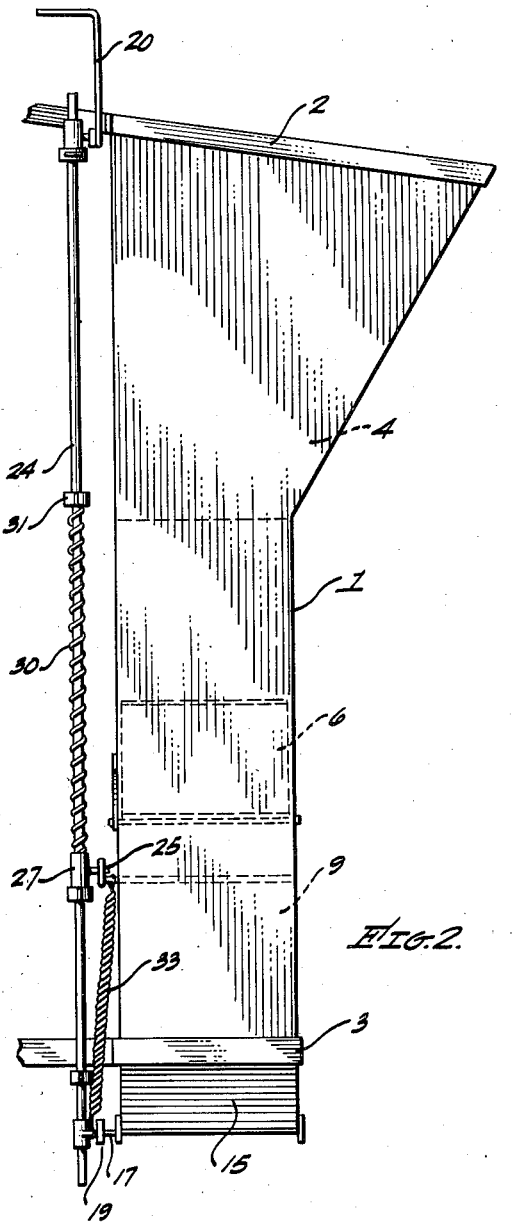
Figure 2:
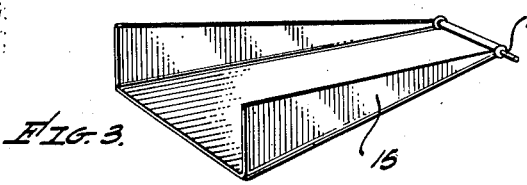
Figure 2 is a side elevation of the same.
Figure 3:
Figure 3 is a perspective view of one of the control gates.

Referring more particularly to the drawing, the numeral 1 indicates a housing which is fixedly attached to a stall or stanchion by means of an upper strap 2, and a lower strap 3, which are fixedly secured to the housing. These straps are bolted or otherwise fixedly secured to the stall or stanchion in a suitable manner. A hopper 4, of considerable capacity, is formed in the upper part of the housing 1, and inclined walls 5—6 form the bottom of the hopper. These walls are inclined inwardly to form a throat 7 between them and through which the feed must pass in dropping into the batch compartments 8 and 9. A vertical wall 10 separates the batch compartments 8 and 9 and this wall terminates below the throat 7. A gate 11 is pivotally mounted on top of the wall 10 and is adapted to be moved to one side or the other across the throat 7, in a manner to be subsequently described. The normal position of the gate 11 is vertical so that feed can drop into the batch compartments 8 and 9 from the hopper 4.

The capacity of the batch compartments 8 and 9 can be varied in the following manner: A wall 12 is pivotally attached to the lower end of the wall 5, and a similar wall 13 is pivotally attached to the lower end of the wall 6. By swinging the walls 12 or 13 upwardly or downwardly it is evident that the capacity of the batch compartments 8 and 9 can be varied. This is possible because our cow feeder distributes dry feed to the cows, and the space in the batch compartments filled by the dry feed can be varied even though there is a space between the adjustable walls 12 and 13 and the wall of the housing 1. The lower ends of the batch compartments 8 and 9 are closed by the chutes 14 and 15, which can be manually swung downwardly to open these batch compartments and permit the feed to drop into a suitable trough available to the cow. The chutes 14 and 15 are pivotally mounted on shafts 16—17, respectively, these shafts being journaled in the housing 1. A link 18 is secured to the shaft 16, and a similar link 19 is secured to the shaft 17. The chutes 14 and 15 are opened and closed by means of these links, as will be subsequently described.

A handle 20 is pivotally mounted on the upper end of the housing 1 and this handle is provided with two outwardly projecting fingers 21—22. A rod 23 is pivotally secured to the finger 21 and a similar rod 24 is pivotally secured to the finger 22. A lever 25 is fixedly secured to the gate 11 on the outside of the housing 1, and the rod 23 is pivotally secured to one end of this lever by the fitting 26, and the rod 24 is pivotally secured to the other end of the lever 25 by the fitting 27. A spring 28 encircles the rod 23 and bears against a collar 29 on the rod at its upper end, and a spring 30 encircles the rod 24 and bears against a collar 31 at its upper end. A spring 32 extends from the link 18 upwardly and is attached at its upper end to the housing 1 for the purpose of urging the chute 14 to a closed position. A similar spring 33 is secured to the link 19 at one end and to the housing 1 at the other for the purpose of urging the chute 15 to a closed position.

In operation the hopper 4 is filled with a dry feed, and this feed will drop downwardly and will be deflected by the walls 5 and 6 into the throat 7. The gate 11 is in a vertical position so that the dry feed can fill the batch compartments 8 and 9. The chutes 14 and 15 are closed, due to the pressure of the springs 32 and 33. If it is desired to open the chute 14, for example, the handle 20 is swung to the left. This depresses the rod 23 which actuates the link 18 and causes the chute 14 to rotate on its pivot and swing downwardly, as shown in dotted lines in Figure 1. The gate 11 will be swung to the left, as shown in dotted lines in Figure 1, thus closing the throat 7 and preventing any additional feed from dropping into the compartment 8. Therefore, the feed originally within the compartment 8 will drop out through the chute 14 and into a suitable receptacle available to the animal. When pressure is released on the handle 20 the spring 32 will return the chute 14 to its closed position, and will push the rod 23 upwardly, thus returning the gate 11 to its vertical position, at which time feed will again drop from the hopper 4 into the batch compartment 8 to fill the same. By adjusting the walls 12 or 13 the capacity of the batch compartments 8 and 9 can be varied to suit the requirements of a particular animal. The chute 15 can be opened and closed in the same manner as previously described, and thus animals in adjacent stalls or stanchions can be fed from the same feeder.

Having described our invention, we claim:

1. A cow feeder comprising a housing, said housing having a hopper therein, and a batch compartment below the hopper, a chute closing the bottom of the batch compartment and pivotally mounted on the housing, a rod mounted for longitudinal movement on the housing, means attaching the lower end of the rod to said chute to swing the chute to open position on longitudinal movement of the rod, and spring means engaging the chute to return the chute to closed position, a plate in the housing defining one wall of the batch compartment, means pivotally mounting the plate, said plate being movable on its pivot to vary the capacity of the batch compartment.

2. A cow feeder comprising a housing, said housing having a hopper therein, and a batch compartment below the hopper, said housing having a throat therein between the hopper and the batch compartment, a gate mounted in the housing and positioned in said throat, a chute closing the bottom of the batch compartment and pivotally mounted on the housing, a rod mounted for longitudinal movement on the housing, means attaching the lower end of the rod to said chute to swing the chute to open position on longitudinal movement of the rod, spring means engaging the chute to return the chute to closed position, and means connecting said rod and said gate to swing the gate to closed position on downward movement of the rod, a plate in the housing defining one wall of the batch compartment, means pivotally mounting the plate, said plate being movable on its pivot to vary the capacity of the batch compartment.

3. A cow feeder comprising a housing, said housing having a hopper in the upper part thereof and batch compartments below the hopper, a chute closing the bottom of each of the compartments, and pivotally mounted in the housing, said housing having a throat therein between the hopper and the batch compartments, a gate pivotally mounted in the housing and in said throat, a pair of rods mounted for longitudinal movement on the housing, a link attached to each of the chutes, each of the rods being pivotally secured to one of the links, a lever secured to said gate, each of the rods being pivotally secured to one end of the lever, a handle pivotally mounted on the housing, means attaching the handle to each of the rods, and spring means engaging each of the chutes to return the chutes to closed position, a plate in the housing defining one wall of each of the batch compartments, means pivotally mounting the plates in the housing, said plates being movable on their pivots to vary the capacity of the batch compartments.

References Cited in the file of this patent

UNITED STATES PATENTS

| | | |
|---|---|---|
| 233,136 | Bell | Oct. 12, 1880 |
| 386,695 | Helers | July 24, 1888 |
| 1,270,937 | Gibbons | July 2, 1918 |
| 1,969,091 | Miles | Aug. 7, 1934 |